United States Patent
Comiskey et al.

(10) Patent No.: US 8,434,314 B2
(45) Date of Patent: *May 7, 2013

(54) CLIMATE CONTROL SYSTEMS AND METHODS

(75) Inventors: Brian Comiskey, Coto de Caza, CA (US); John Terech, Milan, MI (US)

(73) Assignee: Gentherm Incorporated, Northville, MI (US)

( * ) Notice: Subject to any disclaimer, the term of this patent is extended or adjusted under 35 U.S.C. 154(b) by 228 days.

This patent is subject to a terminal disclaimer.

(21) Appl. No.: 12/941,779

(22) Filed: Nov. 8, 2010

(65) Prior Publication Data

US 2011/0048033 A1    Mar. 3, 2011

Related U.S. Application Data

(63) Continuation of application No. 11/525,528, filed on Sep. 22, 2006, now Pat. No. 7,827,805, which is a continuation-in-part of application No. 11/087,215, filed on Mar. 23, 2005, now abandoned.

(51) Int. Cl.
    *F25B 21/02* (2006.01)
(52) U.S. Cl.
    USPC ............................................. 62/3.3; 62/244
(58) Field of Classification Search ......... 62/3.2, 62/3.3, 3.61, 244, 351, 126, 159; 454/120, 454/907; 297/180.1, 180.13, 180.14
    See application file for complete search history.

(56) References Cited

U.S. PATENT DOCUMENTS

| | | | | |
|---|---|---|---|---|
| 3,136,577 | A | * | 6/1964 | Richard .................. 297/180.11 |
| 3,137,523 | A | | 6/1964 | Karner |
| 4,413,857 | A | * | 11/1983 | Hayashi .................. 297/180.11 |
| 4,671,567 | A | | 6/1987 | Frobose |
| 4,685,727 | A | | 8/1987 | Cremer et al. |
| 4,700,046 | A | | 10/1987 | Fristedt |
| 5,002,336 | A | | 3/1991 | Feher |
| 5,088,790 | A | | 2/1992 | Wainwright et al. |
| 5,106,161 | A | | 4/1992 | Meiller |
| 5,117,638 | A | | 6/1992 | Feher |
| 5,229,579 | A | | 7/1993 | Ingraham et al. |
| 5,385,382 | A | | 1/1995 | Single, II et al. |
| 5,487,002 | A | | 1/1996 | Diller et al. |

(Continued)

FOREIGN PATENT DOCUMENTS

| | | |
|---|---|---|
| DE | 10238552 | 8/2001 |
| DE | 10115242 | 10/2002 |

(Continued)

OTHER PUBLICATIONS

U.S. Appl. No. 90/011,326, Comiskey et al.

(Continued)

*Primary Examiner* — Mohammad Ali
(74) *Attorney, Agent, or Firm* — Knobbe, Martens, Olson & Bear, LLP

(57) ABSTRACT

A method for thermally conditioning a space adjacent a seat assembly includes activating a heating element positioned within the seat assembly beneath a seat covering. A fluid module that includes a fluid supply device and a thermoelectric element is activated to direct heated air from the fluid module to a space adjacent the seat assembly through a distribution system formed at least partially in the seat cushion. After a period of time, the heating element is deactivated.

17 Claims, 9 Drawing Sheets

U.S. PATENT DOCUMENTS

| | | | |
|---|---|---|---|
| 5,505,520 | A | 4/1996 | Frusti et al. |
| 5,524,439 | A * | 6/1996 | Gallup et al. .................... 62/3.5 |
| 5,597,200 | A * | 1/1997 | Gregory et al. .......... 297/180.13 |
| 5,626,021 | A | 5/1997 | Karunasiri et al. |
| 5,887,304 | A | 3/1999 | von der Heyde |
| 5,902,014 | A | 5/1999 | Dinkel et al. |
| 5,921,314 | A | 7/1999 | Schuller et al. |
| 5,924,766 | A * | 7/1999 | Esaki et al. .............. 297/180.13 |
| 5,927,817 | A | 7/1999 | Ekman et al. |
| 5,934,748 | A | 8/1999 | Faust et al. |
| 6,003,950 | A | 12/1999 | Larsson |
| 6,019,420 | A | 2/2000 | Faust et al. |
| 6,059,018 | A | 5/2000 | Yoshinori et al. |
| 6,062,641 | A | 5/2000 | Suzuki et al. |
| 6,079,485 | A | 6/2000 | Esaki et al. |
| 6,119,463 | A | 9/2000 | Bell |
| 6,145,925 | A | 11/2000 | Eksin et al. |
| 6,164,719 | A | 12/2000 | Rauh |
| 6,186,592 | B1 | 2/2001 | Orizaris et al. |
| 6,189,966 | B1 | 2/2001 | Faust et al. |
| 6,196,627 | B1 | 3/2001 | Faust et al. |
| 6,206,465 | B1 | 3/2001 | Faust et al. |
| 6,223,539 | B1 | 5/2001 | Bell |
| 6,291,803 | B1 | 9/2001 | Fourrey |
| 6,439,658 | B1 | 8/2002 | Ganz et al. |
| RE38,128 | E * | 6/2003 | Gallup et al. .................... 62/3.5 |
| 6,598,251 | B2 | 7/2003 | Habboub et al. |
| 6,604,785 | B2 | 8/2003 | Bargheer et al. |
| 6,606,866 | B2 | 8/2003 | Bell |
| 6,619,736 | B2 * | 9/2003 | Stowe et al. ............. 297/180.14 |
| 6,626,488 | B2 * | 9/2003 | Pfahler .................... 297/180.11 |
| 6,644,735 | B2 * | 11/2003 | Bargheer et al. ......... 297/180.13 |
| 6,676,207 | B2 * | 1/2004 | Rauh et al. .............. 297/180.14 |
| 6,686,562 | B1 | 2/2004 | Weiss et al. |
| 6,695,402 | B2 | 2/2004 | Sloan, Jr. |
| 6,700,052 | B2 | 3/2004 | Bell |
| 6,710,303 | B1 * | 3/2004 | Lorenzen ...................... 219/217 |
| 6,740,816 | B2 | 5/2004 | Treutlein et al. |
| 6,761,399 | B2 | 7/2004 | Bargheer et al. |
| 6,786,541 | B2 * | 9/2004 | Haupt et al. ................ 297/180.1 |
| 6,786,545 | B2 * | 9/2004 | Bargheer et al. .......... 297/217.1 |
| 6,808,230 | B2 | 10/2004 | Buss et al. |
| 6,828,528 | B2 | 12/2004 | Stowe et al. |
| 6,857,697 | B2 | 2/2005 | Brennan et al. |
| 6,869,139 | B2 * | 3/2005 | Brennan et al. ............ 297/180.1 |
| 6,872,882 | B2 | 3/2005 | Fritz |
| 6,884,965 | B2 | 4/2005 | Nelson et al. |
| 6,892,807 | B2 | 5/2005 | Fristedt |
| 6,893,086 | B2 | 5/2005 | Bajic et al. |
| 6,907,739 | B2 * | 6/2005 | Bell ................................. 62/3.7 |
| 6,976,734 | B2 | 12/2005 | Stoewe |
| 6,977,360 | B2 | 12/2005 | Weiss |
| 7,040,710 | B2 | 5/2006 | White et al. |
| 7,052,091 | B2 | 5/2006 | Bajic et al. |
| 7,053,344 | B1 | 5/2006 | Surjan et al. |
| 7,070,232 | B2 | 7/2006 | Minegishi et al. |
| 7,083,227 | B2 | 8/2006 | Brennan et al. |
| 7,108,319 | B2 * | 9/2006 | Hartwich et al. .......... 297/180.1 |
| 7,114,771 | B2 | 10/2006 | Lofy et al. |
| 7,131,689 | B2 | 11/2006 | Brennan et al. |
| 7,141,760 | B2 | 11/2006 | Howick et al. |
| 7,178,344 | B2 | 2/2007 | Bell |
| 7,196,288 | B2 | 3/2007 | Weiss et al. |
| 7,201,441 | B2 | 4/2007 | Stoewe et al. |
| 7,205,510 | B2 | 4/2007 | Howick et al. |
| 7,475,464 | B2 | 1/2009 | Lofy et al. |
| 7,587,901 | B2 | 9/2009 | Petrovski |
| 7,591,507 | B2 | 9/2009 | Giffin et al. |
| 7,640,754 | B2 | 1/2010 | Wolas |
| 7,665,803 | B2 | 2/2010 | Wolas |
| 7,708,338 | B2 | 5/2010 | Wolas |
| RE41,765 | E | 9/2010 | Gregory et al. |
| 7,827,805 | B2 | 11/2010 | Comiskey et al. |
| 7,877,827 | B2 | 2/2011 | Marquette et al. |
| 7,963,594 | B2 | 6/2011 | Wolas |
| 7,966,835 | B2 | 6/2011 | Petrovski |
| 7,996,936 | B2 | 8/2011 | Marquette et al. |
| 8,065,763 | B2 | 11/2011 | Brykalski et al. |
| 8,104,295 | B2 | 1/2012 | Lofy |
| 8,143,554 | B2 | 3/2012 | Lofy |
| 8,181,290 | B2 | 5/2012 | Brykalski et al. |
| 8,191,187 | B2 | 6/2012 | Brykalski et al. |
| 8,222,511 | B2 | 7/2012 | Lofy |
| 8,256,236 | B2 | 9/2012 | Lofy |
| 2003/0145380 | A1 | 8/2003 | Schmid |
| 2004/0090093 | A1 * | 5/2004 | Kamiya et al. ........... 297/180.14 |
| 2004/0164594 | A1 * | 8/2004 | Stoewe et al. ............ 297/180.14 |
| 2005/0285438 | A1 | 12/2005 | Ishima et al. |
| 2006/0087160 | A1 | 4/2006 | Dong et al. |
| 2006/0214480 | A1 | 9/2006 | Terech |
| 2006/0273646 | A1 | 12/2006 | Comiskey et al. |
| 2006/0284455 | A1 | 12/2006 | Terech |
| 2007/0001489 | A1 | 1/2007 | Terech |
| 2007/0200398 | A1 | 8/2007 | Wolas et al. |
| 2007/0204629 | A1 | 9/2007 | Lofy |
| 2007/0262621 | A1 | 11/2007 | Dong et al. |
| 2007/0277313 | A1 | 12/2007 | Terech |
| 2008/0047598 | A1 | 2/2008 | Lofy |
| 2008/0087316 | A1 | 4/2008 | Inaba et al. |
| 2008/0148481 | A1 | 6/2008 | Brykalski et al. |
| 2008/0164733 | A1 | 7/2008 | Giffin et al. |
| 2008/0166224 | A1 | 7/2008 | Giffin et al. |
| 2008/0173022 | A1 | 7/2008 | Petrovski |
| 2008/0223841 | A1 | 9/2008 | Lofy |
| 2009/0025770 | A1 | 1/2009 | Lofy |
| 2009/0026813 | A1 | 1/2009 | Lofy |
| 2009/0033130 | A1 | 2/2009 | Marquette et al. |
| 2009/0193814 | A1 | 8/2009 | Lofy |
| 2009/0218855 | A1 | 9/2009 | Wolas |
| 2010/0001558 | A1 | 1/2010 | Petrovski |
| 2010/0011502 | A1 | 1/2010 | Brykalski et al. |
| 2010/0193498 | A1 | 8/2010 | Walsh |
| 2011/0048033 | A1 | 3/2011 | Comiskey et al. |
| 2011/0107514 | A1 | 5/2011 | Brykalski et al. |
| 2011/0115635 | A1 | 5/2011 | Petrovski et al. |
| 2011/0253340 | A1 | 10/2011 | Petrovski |
| 2011/0296611 | A1 | 12/2011 | Marquette et al. |
| 2012/0080911 | A1 | 4/2012 | Brykalski et al. |
| 2012/0104000 | A1 | 5/2012 | Lofy |
| 2012/0114512 | A1 | 5/2012 | Lofy et al. |
| 2012/0131748 | A1 | 5/2012 | Brykalski et al. |
| 2012/0227182 | A1 | 9/2012 | Brykalski et al. |

FOREIGN PATENT DOCUMENTS

| | | |
|---|---|---|
| WO | WO 02/11968 | 2/2002 |
| WO | WO 02/053400 | 7/2002 |
| WO | WO 03/051666 | 6/2003 |

OTHER PUBLICATIONS

International Search Report for Application No. PCT/US2006/010597 (the PCT counterpart of the parent application, U.S. Appl. No. 11/087,215) mailed Jul. 26, 2006.

Feher, Steve, Thermoelectric Air Conditioned Variable Temperature Seat (VTS) & Effect Upon Vehicle Occupant Comfort, Vehicle Energy Efficiency, and Vehicle Environment Compatibility, SAE Technical Paper, Apr. 1993, pp. 341-349.

Lofy, J. et al., Thermoelectrics for Environmental Control in Automobiles, Proceeding of Twenty-First International Conference on Thermoelectrics (ICT 2002), published 2002, pp. 471-476.

Advantage Online: The Climate Control Seat System, Current Events/News: e-newsletters, Aug. 27, 2001.

\* cited by examiner

CLIMATE CONTROL SYSTEMS AND METHODS

PRIORITY INFORMATION

This application is a continuation of co-pending U.S. patent application Ser. No. 11/525,528, filed Sep. 22, 2006, which is a continuation-in-part of U.S. patent application Ser. No. 11/087,215, filed Mar. 23, 2005 and now abandoned, the entireties of both of which are hereby expressly incorporated by reference herein.

BACKGROUND OF THE INVENTION

1. Field of the Invention

This invention relates to temperature control. More specifically, this invention relates to temperature control of a seat.

2. Description of the Related Art

Temperature modified air for environmental control of living or working space is typically provided to relatively extensive areas, such as entire buildings, selected offices, or suites of rooms within a building. In the case of vehicles, such as automobiles, the entire vehicle is typically cooled or heated as a unit. There are many situations, however, in which more selective or restrictive air temperature modification is desirable. For example, it is often desirable to provide an individualized climate control for an occupant seat so that substantially instantaneous heating or cooling can be achieved. For example, an automotive vehicle exposed to the summer weather, where the vehicle has been parked in an unshaded area for a long period, can cause the vehicle seat to be very hot and uncomfortable for the occupant for some time after entering and using the vehicle, even with normal air conditioning. Furthermore, even with normal air-conditioning, on a hot day, the occupant's back and other pressure points may remain sweaty while seated. In the winter, it is highly desirable to have the ability to warm the seat of the occupant quickly to facilitate the occupant's comfort, especially where the normal vehicle heater is unlikely to warm the vehicle's interior as quickly.

For such reasons, there have been various types of individualized temperature control systems for vehicle seats. Such temperature control systems typically include a distribution system comprising a combination of channels and passages formed in the back and/or seat cushions of the seat. A thermal module thermally conditions the air and delivers the conditioned air to the channels and passages. The conditioned air flows through the channels and passages to cool or heat the space adjacent the surface of the vehicle seat.

There are, however, drawbacks with existing temperature control systems for seats. For example, in particularly adverse conditions, it may take the conditioned air a long period of time to heat noticeably the seat. In addition, while climate control systems that use thermal modules provide many advantages, they are relatively expensive and thus may not be suitable for all applications.

Thus, there is a need for an improved temperature control apparatus for a climate control system for seats.

SUMMARY OF THE INVENTION

Accordingly, one aspect of the present invention comprises a method for thermally conditioning a space adjacent a seat assembly that includes activating a heating element positioned within the seat assembly beneath a seat covering. A fluid module that includes a fluid supply device and a thermoelectric element is activated to direct heated air from the fluid module to a space adjacent the seat assembly through a distribution system formed at least partially in the seat cushion. After a period of time, the heating element is deactivated.

Another aspect of the present invention comprises a climate controlled seat assembly that includes a seat cushion having an outer surface. A supply passage extends through the seat cushion and includes an inlet. A distribution system comprises at least one distribution passage configured to distribute air along the support surface of the seat cushion. The distribution system communicates with the supply passage. A seat covering is positioned over the outer surface of the seat cushion. A heat source is positioned between the seat covering and the inlet to the supply passage. A fluid module is operatively connected to the inlet of the supply passage. The fluid module includes a fluid transfer device configured to move air between the distribution system and the supply passage and a thermoelectric device configured to heat air moving the fluid module. A control system is configured to activate, upon receiving an input signal generated by a user, the fluid module to provide heated air to the outer surface of the seat cushion and to activate the heat source for a predetermined period of time.

Another aspect of the present invention comprises a seat cushion having a front or top side configured to support an occupant and a generally opposing rear or bottom side. Fluids passages extend through from rear or bottom side of the seat cushion to the front or top side of the seat cushion. A fluid module includes a fluid device configured to move fluid within the fluid passages and a thermal element configured only to cool fluid moved by the fluid device. A restive heater is disposed on the front or top side of the seat cushion.

Another aspect of the present invention comprises a method for thermally conditioning a space adjacent a seat assembly that includes a seat cushion that defines a support surface and seat covering that covers the support surface of the seat cushion. The method comprises, during a heating mode, activating a heating element positioned within the seat assembly to heat the space adjacent the seat assembly. During a cooling mode, cooled air is directed from a fluid module that includes a thermoelectric unit and a fluid transfer device to the space adjacent the seat assembly through a distribution system formed at least partially in the seat cushion to cool the space adjacent the seat assembly.

Another aspect of the present invention relates to a method for thermally conditioning a space adjacent a seat assembly that includes a seat cushion that defines a support surface and seat covering that covers the support surface of the seat cushion. The method comprises, during a first mode, directing heated air from a fluid module that includes a thermoelectric unit and a fluid transfer device to the space adjacent the seat assembly through a distribution system formed at least partially in the seat cushion to heat the space adjacent the seat assembly. During a second mode, a heating element positioned within the seat assembly between the seat covering and the fluid module is activated while directing heated air from the fluid module through the distribution system to heat the space adjacent the seat assembly.

Further features and advantages of the present invention will become apparent to those of ordinary skill in the art in view of the detailed description of preferred embodiments which follow, when considered together with the attached drawings and claims.

DETAILED DESCRIPTION OF THE PREFERRED EMBODIMENT

Figure 1:
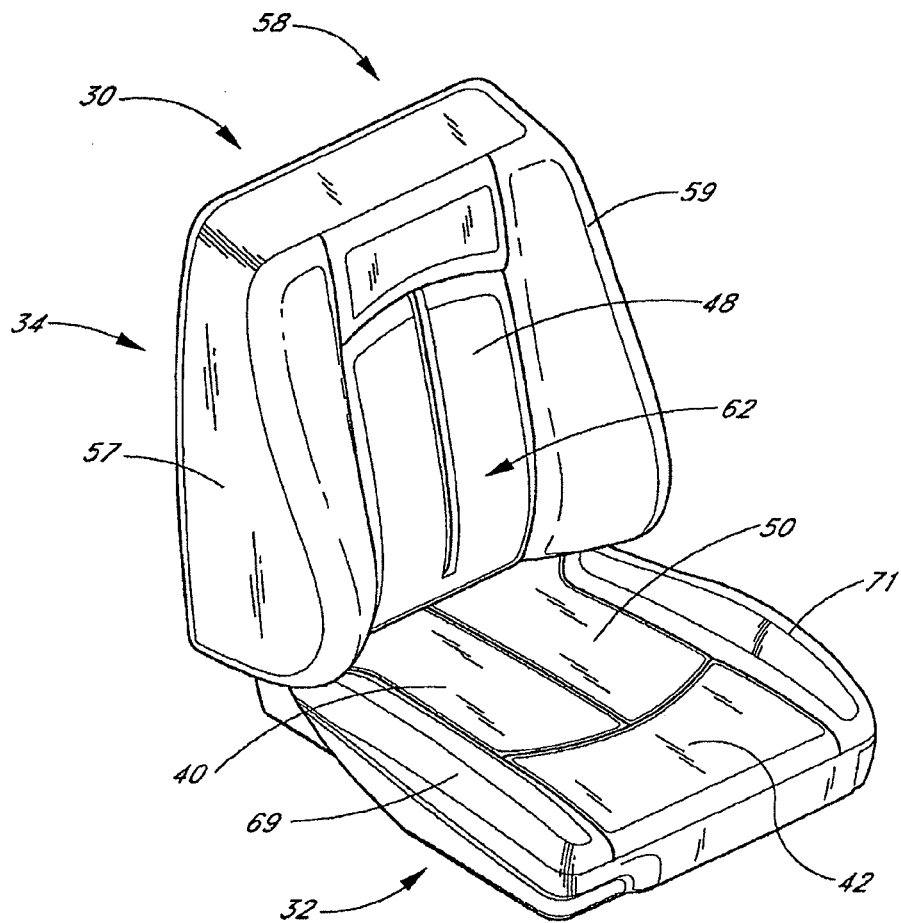
FIG. 1 is a perspective view of a vehicle seat assembly, which includes a climate control system that is configured in accordance with a preferred embodiment of the present invention.
Figure 2:
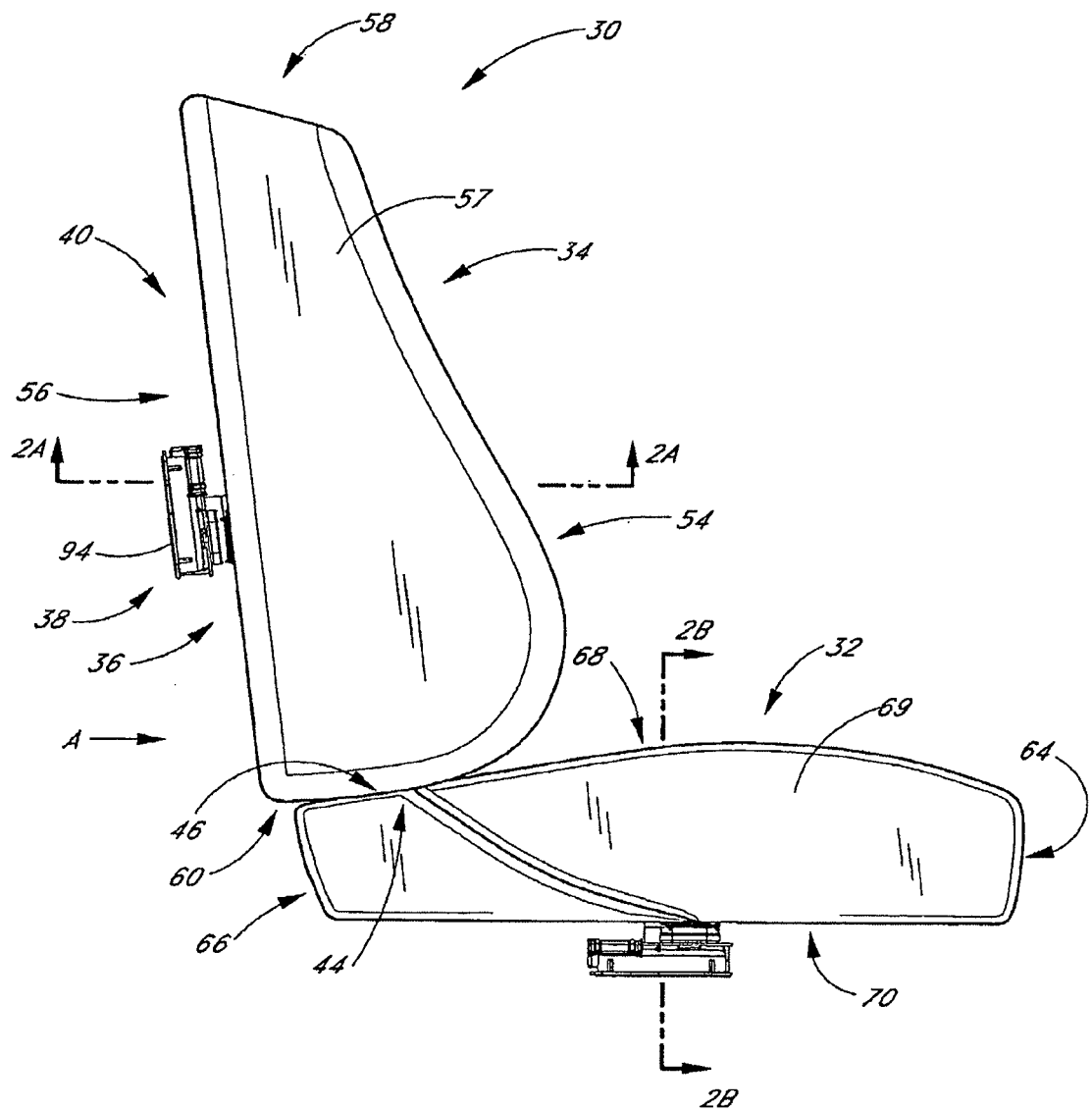
FIG. 2 is a side view of the vehicle seat assembly of FIG. 1.

FIGS. 1 and 2 illustrate an exemplary embodiment of a seat assembly 30 that comprises a seat portion 32 and a backrest portion 34. The seat assembly 30 includes a climate control system 36, which will be described in more detail below with reference to FIGS. 2A-4.

When an occupant sits in the seat assembly 30, the occupant's seat is located generally in a seat area 40 of the seat portion 32 and at least a portion of their legs are supported by a thigh area 42 of the seat portion 32. In this embodiment, a rear end 44 of the seat portion 32 is coupled to a bottom end 46 of the backrest portion 34. When the occupant sits in the seat assembly 30, the occupant's back contacts a front surface 48 of the backrest portion 34 and the occupant's seat and legs contact a top surface 50 of the seat portion 32. The surfaces 48, 50 cooperate to support the occupant in a sitting position. The seat assembly 30 can be configured and sized to accommodate occupants of various size and weight.

In the illustrated embodiment, the seat assembly 30 is similar to a standard automotive seat. However, it should be appreciated that certain features and aspects of the seat assembly 30 described herein may also be used in a variety of other applications and environments. For example, certain features and aspects of the seat assembly 30 may be adapted for use in other vehicles, such as, for example, an airplane, a boat, or the like. Further, certain features and aspects of the seat assembly 30 may also be adapted for use in stationary environments, such as, for example, a chair, a sofa, a theater seat, a mattress, and an office seat that is used in a place of business and/or residence. Other configurations of the seat assembly 30 are also anticipated, such as, for example, bench seating.

With continued reference to FIGS. 1 and 2, the backrest portion 34 has a front side 54, a rear side 56, a top side 58 and a bottom side 60. The backrest portion 34 includes a pair of sides 57, 59 extending between the top side 58 and bottom side 60 for providing lateral support to the occupant of the seat assembly 30. A lumbar region 62 of the backrest portion 34 is generally positioned between the sides 57, 59 of the backrest portion 34 near the seat portion 32.

In a similar manner, the seat portion 32 has a front side 64, a rear side 66, a top side 68 and a bottom side 70. The seat portion 32 also includes a pair of sides 69, 71, which extending from the rear side 66 and the front side 64 for providing lateral support to the occupant of the seat assembly 30. In one embodiment, the seat assembly 30 is secured to a vehicle by attaching the bottom side 70 of the seat portion 32 to the floor of a vehicle.

Figure 2A:
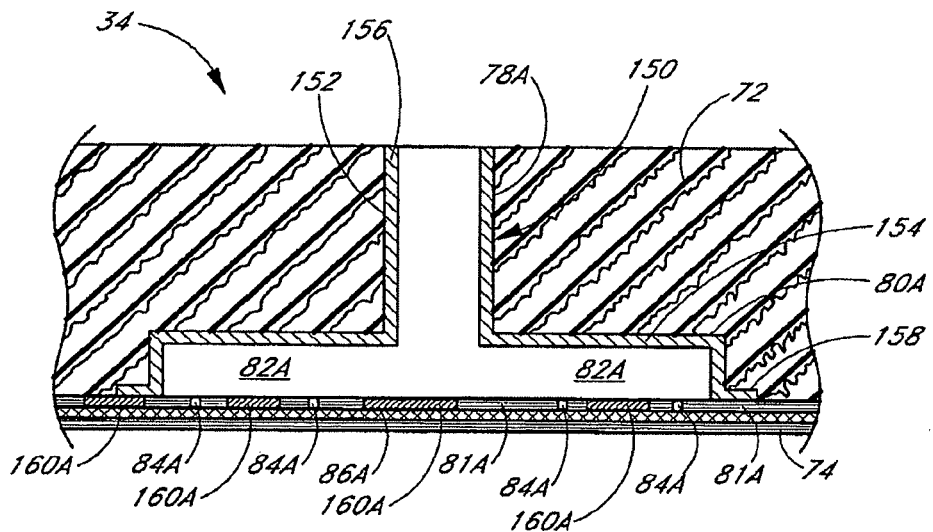
FIG. 2A is a cross-sectional view of the vehicle seat assembly of FIG. 1 taken along line 2A-2A of FIG. 2.

FIG. 2A is a cross-sectional view of a portion of the backrest portion 34. As shown, the backrest portion 34 is generally formed by a cushion 72, which is covered with an appropriate covering material 74 (e.g., upholstery, leather or vinyl). The cushion 72 is usually supported on a metallic or plastic frame (not shown). In some embodiments, springs may be positioned between the frame and the cushion 72. The frame provides the seat assembly 30 with structural support while the cushion 72 provides a soft seating surface. The covering material 74 provides an aesthetic appearance and soft feel to the surface of the seat assembly 30. The seat portion 32 of FIG. 2B may be constructed in a similar manner as the backrest portion 34 as shown in FIG. 2A.

Figure 3:
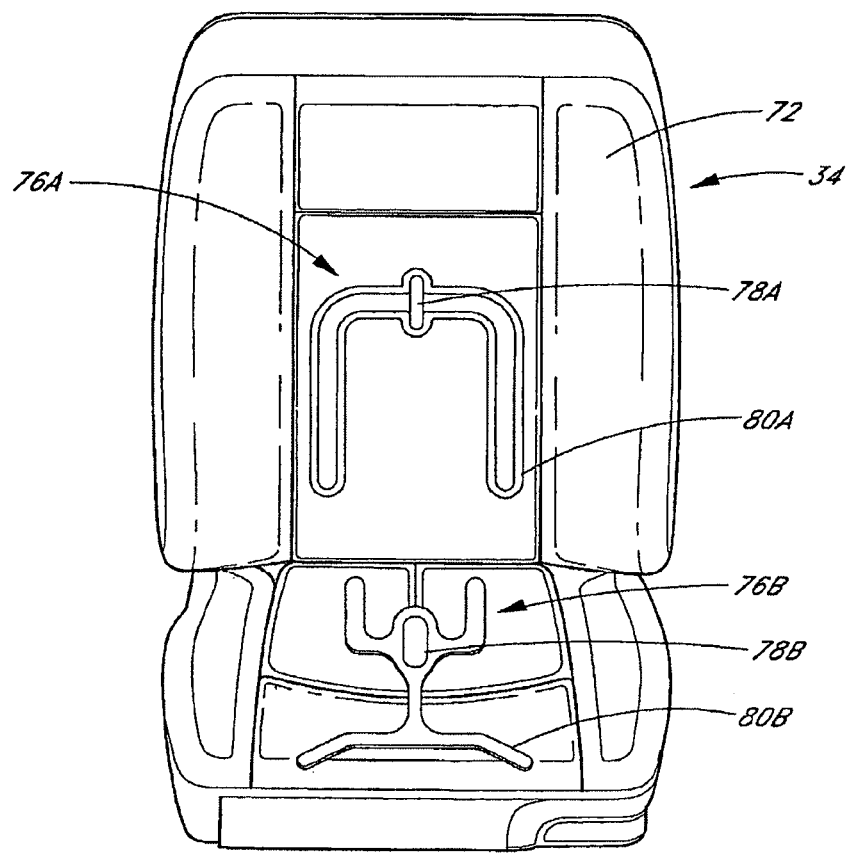
FIG. 3 is a front view of the vehicle seat assembly of FIG. 1 with a covering of the seat vehicle assembly removed.

FIG. 3 illustrates the seat assembly 32 with the covering 74 removed thereby exposing the cushion 72. The cushion 72 can be a typical automotive seat cushion foam or other types of materials with suitable characteristics for providing support to an occupant. Such materials include, but are not limited to, closed or open-celled foam.

Figure 3A:
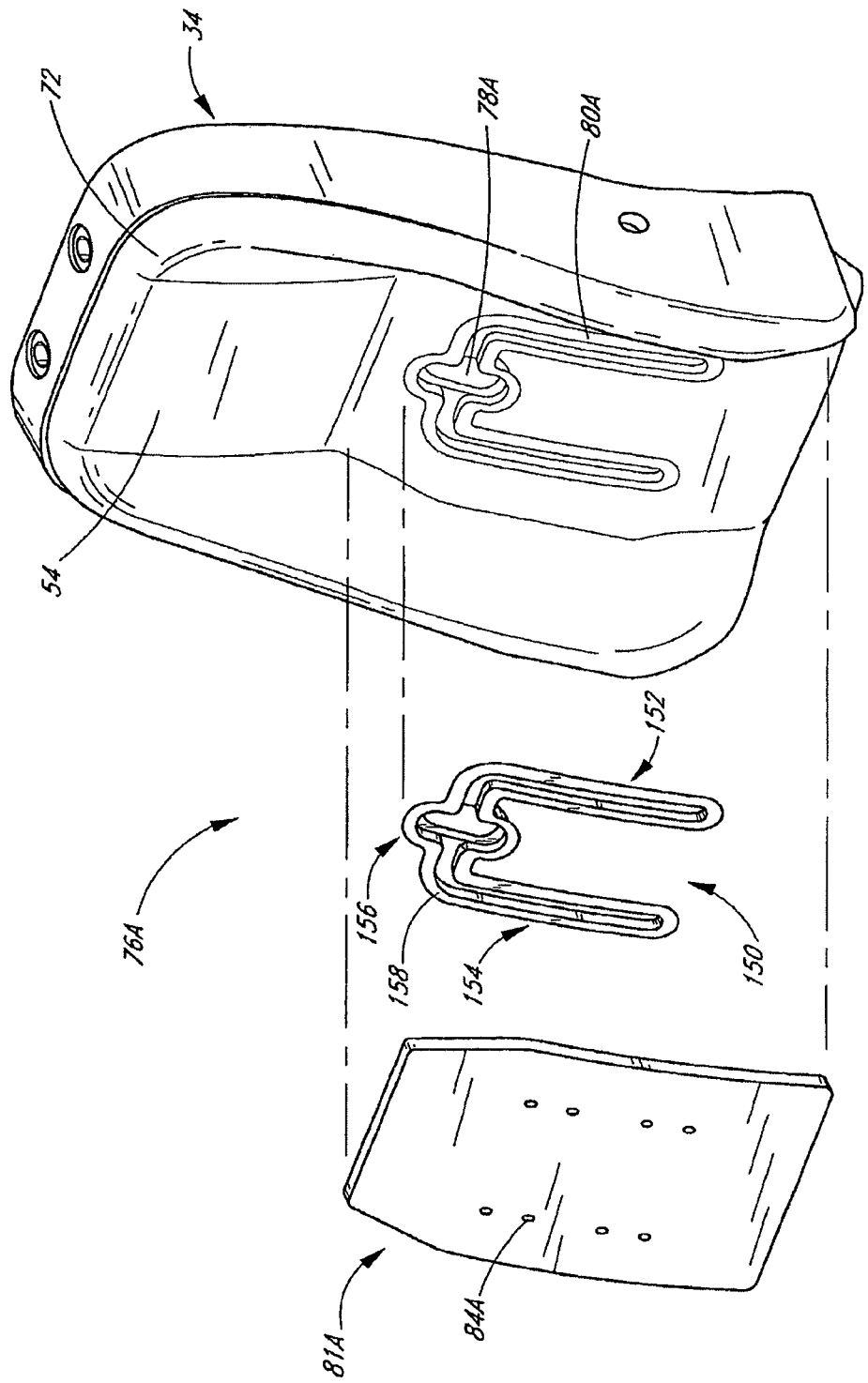
FIG. 3A is an exploded, side perspective view of a backrest of the vehicle seat assembly of FIG. 1.

As shown in FIGS. 3 and 3A, the backrest portion 34 of the seat assembly 30 is provided with a backrest fluid distribution system 76A. The distribution system 76A comprises an inlet passage 78A that extends through from the front side 54 to the rear side 56 of the seat cushion 72. (See also FIG. 2A). The distribution system 76A also includes at least one, and often, a plurality of channels 80A, which extend from the inlet passage 78A. As mentioned above, the cushion 72 may be formed from a typical automotive cushion material, such as, for example, an open or closed-cell foam. In one embodiment, the cushion 72 is made of foam that is pre-molded to form the passage 78A and/or the channels 80A. In another embodiment, the passage 78A and/or the channels 80A may be formed by cutting foam out of the seat cushion 72.

With particular reference to FIG. 3A, in the illustrated embodiment, an insert or liner 150 may be positioned within the channels 80A, 80B for distributing the air. As shown, the insert 150 generally comprises a body 152, which includes a plurality of channels or plenums 154 with a generally U-shaped cross-section. The insert 150 is configured to fit generally with the channels 80A formed in the cushion 72. The plenums 154 extend from a duct 156 that extends through the inlet passage 78A. The periphery of the plenums 154 and duct 156 includes a flange 158 that extends generally parallel to the surface of the cushion 71. See FIG. 2A. The insert 150 is preferably formed of a moisture resistant, closed cell foam, which is configured to limit seepage of air into the cushion 72. However, in other embodiments, the insert 150 can be formed from other materials, such as, for example, molded plastic. Further details and additional embodiments of the insert 150 are provided in co-pending U.S. patent application Ser. No. 10/853,779, filed May 25, 2004, the entire contents of which are hereby incorporated by reference herein. As will be described below with reference to FIG. 2B, in a modified embodiment, the distribution system 76A may be formed without the insert 150.

With reference back to FIG. 2A, a cover or scrim 81A is positioned generally over the insert 150 to define distribution passages 82A for transporting air through the seat assembly 30. The scrim 81A includes one or more openings 84A for transporting air to and/or from the distribution passages 82A and preferably provides structural support to prevent or reduce the seat cover 74 from depressing into the passages 82A. The scrim 81A preferably includes one or more thermal elements 160A, which are preferably positioned within the scrim 81A generally adjacent the one or more openings 84A and are configured to effect a temperature change in the space adjacent the seat assembly 30. As will be explained in more detail below, in the illustrated embodiment, the thermal elements 160A are used to heat the air transported through the seat assembly and/or heat the portions of the seat assembly adjacent the thermal elements 160A.

The thermal elements 160A may comprise any of variety of devices for causing a temperature change, such as, for example, resistive heaters (e.g., resistive wires, carbon fiber based heating elements, and carbon impregnated sheets), chemical-reaction heaters, heat exchanges and/or Peltier thermoelectric devices. The thermal elements 160A may be used in combination with fabrics, foams etc. to form the scrim 81A. In another embodiment, the thermal elements 160A may be coupled to or positioned generally near the scrim 81A. In the illustrated embodiment, the scrim 81A is attached to the flange 158 in a manner that limits leakage between the scrim 81A and insert 150 thereby directing the flow of air through the openings 84A. In one embodiment, an adhesive is used to attach the scrim 81A to the insert 150. In other embodiments, a heat stake or fasteners may be used.

With continued reference to FIG. 2A, an optional distribution layer 86A is disposed between the scrim 81A and the seat covering 74. The distribution layer 86A spreads the air flowing through the openings 84A along the lower surface of the covering 74. To permit airflow between the distribution layer 86A and the spaces proximal to the front surface 48 of the backrest portion 34, the covering 74 may be formed from an air-permeable material. For example, in one embodiment, the covering 74 comprises an air-permeable fabric made of natural and/or synthetic fibers. In another embodiment, the covering 74 is formed from a leather, or leather-like material that is provided with small openings or apertures. In a modified embodiment, the distribution layer 86A may be omitted or combined with the seat covering 74 and/or the scrim 81A. As mentioned above, the scrim 81A is configured to allow for the passage of air. In the illustrated embodiment, this is accomplished by providing the scrim 81A with small openings or apertures. In another embodiment, the scrim 81A itself and/or the thermal elements 160A may be generally air-permeable With reference to FIGS. 2B and 3, the seat portion 32 of the seat assembly 30 is also provided with a seat distribution system 76B. The seat distribution system 76B comprises an inlet passage 78B that extends from the top side 68 to the bottom side 70 of the seat cushion 72. As with the backrest distribution system 76A, the seat distribution system 76B also includes at least one, and often, a plurality of channels 80B, which extend from the inlet passage 78B. These channels 80B may be configured as described above.

In the seat distribution system 76B, the portion of the cushion 72 that forms the channels 80B is preferably treated and/or covered with a coating, skin or other material configured such that air flowing through the channels 80B does not significantly seep into the cushion 72. In another embodiment, the cushion 72 may be formed from a dense foam that does not allow for significant seepage of air through the foam. In addition to or in the alternative, the seat distribution system 76B may include an insert or liner as described above with reference to FIGS. 2A and 3A.

The channels 80B are covered by a scrim or cover 81B to define distribution passages 82B for transporting air through the seat assembly 30. The scrim 81B is preferably configured as described above. Accordingly, the scrim 81B includes thermal elements 160B and one or more openings 84B for delivering air to and/or from the distribution passages 82B. As described above, the scrim 81B is preferably attached to the cushion 72 in a manner that limits leakage between the scrim 81B and cushion 72. A distribution layer 86B is optionally disposed between the scrim 81B and the seat covering 74. As mentioned above, in a modified embodiment, the distribution layer 86B can be omitted or combined with the seat covering 74 and/or the scrim 81A. In addition, as with the covering 74, the scrim 81A itself may be configured such that it is generally air-permeable and/or provided with small openings or apertures 84B as shown in the illustrated embodiment.

As will be explained in more detail below, the thermal elements 160A, 160B are used to change the temperature (e.g., increase) in the space or portions of the seat adjacent the occupant of the seat assembly 30. The thermal elements 160A, 160B are preferably used in combination with fluid flow provided through the distribution system 76A, 76B. As explained below, when used in combination with fluid flow, the air may be conditioned or unconditioned before the thermal elements 160A, 160B changes its temperature. For example, in one embodiment, air (which can be heated) is delivered to the distribution passages 82A, 82B through the inlet passages 78A, 78B. The air then flows through the openings 84A, 84B and into the distribution layers 86A, 86B. The air is then directed through the covering 74 to a space adjacent to the front surface 48 of the backrest portion 34 and/or the top surface 50 of the seat portion 32. In another embodiment, the climate control system 36 is used to remove air, which is adjacent to the front surface 48 of the backrest portion 34 and/or the top surface 50 of the seat portion 32. In such an embodiment, the air is withdrawn through the covering 74 and into the distribution layers 86A, 86B. The air is then withdrawn through the openings 84A, 84B, into the distribution passages 82A, 82B and through the inlet passages 78A, 78B. In this manner, the air withdrawn and/or supplied through the distribution systems 76A, 76B may be used to supplement and/or enhance the thermal elements 160A, 160B. In one embodiment, thermal elements 160A, 160B provide heat to the occupant via conduction through the covering 74 and other layers of material. In such an embodiment, the fluid flow can enhance the thermal elements 160A, 160B by also transferring the heat generated by the thermal elements 160A, 160B to the occupant via convection.

Given the goal of distributing air through the cushion 72 and along the covering 74, those of skill in the art will recognize that the distribution systems 76A, 76B for the backrest portion 34 and the seat portion 32 may be modified in several different manners. For example, the shape and/or number of channels 80A, 80B and/or openings 84A, 84B may be modified. In other embodiments, the scrim 81A, 81B and/or distribution passages 82A, 82B may be combined and/or replaced with other components configured for similar functions. In other embodiments, the distribution systems 76A, 76B or portions thereof may be combined with each other. In addition, various features of the distribution systems 76A, 76B of the backrest portion 34 and seat portion 32 may be combined and/or interchanged with each other.

Figure 4:
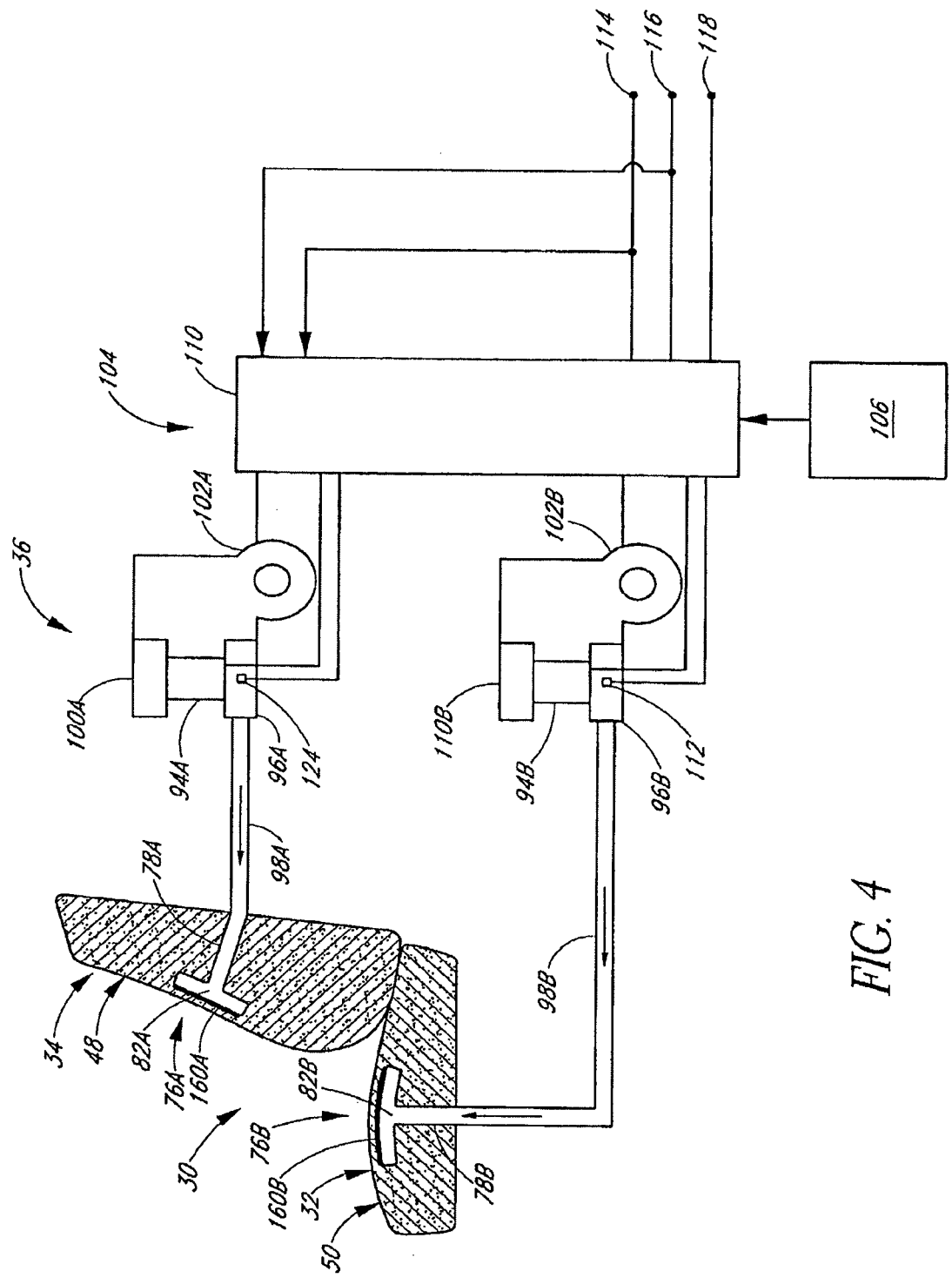
FIG. 4 is a schematic illustration of the vehicle seat assembly and climate control system of FIG. 1.

FIG. 4 is a schematic illustration of the temperature control system 36. In the illustrated embodiment, the temperature control system 36 includes the thermal elements 160A, 160B and the distribution systems 76A, 76B described above. The system 36 also includes a back fluid module 92A and seat fluid module 92B. As will be explained below, both fluid modules 92A, 92B are configured to provide and/or remove fluid from the distribution systems 76A, 76B described above and/or provide conditioned air (e.g., heated air) to the distribution systems 76A, 76B. In this manner, the fluid modules 92A, 92B provide a fluid flow to/from the seat assembly 30, which can be used to enhance or supplement the heat provided by the thermal elements 160A, 160B described above.

In the illustrated embodiment, the fluid modules 92A, 92B preferably each include a thermoelectric device 94A, 94B for conditioning (e.g., selectively healing or cooling) the fluid flowing through the device 94A, 94B. A preferred thermoelectric device 94A, 94B is a Peltier thermoelectric module, which is well known in the art. The illustrated fluid modules 92A, 92B preferably also include a main heat exchanger 96A, 96B for transferring or removing thermal energy from the fluid flowing through the modules 92A, 92B and to the distribution systems 76A, 76B. Such fluid is transferred to the distribution systems 76A, 76B through conduits 98A, 98B (see e.g., U.S. application Ser. No. 10/973,947, filed Oct. 25, 2004, which is hereby incorporated by reference herein). In the illustrated embodiments, the modules 92A, 92B also preferably include a waste heat exchanger 100A, 100B (see FIG. 4) that extends from the thermoelectric device 94A, 94B generally opposite the main heat exchanger 96A, 96B. A pumping device 102A, 102B is preferably associated with each fluid module 92A, 92B for directing fluid over the main and/or waste heat exchangers 96A, 96B, 100A, 100B. The pumping devices 102A, 102B may comprise an electrical fan or blower, such as, for example, an axial blower and/or radial fan. In the illustrated embodiment, a single pumping device 102A, 102B may be used for both the main and waste heat exchanges 96A, 96B, 100A, 100B. However, it is anticipated that separate pumping devices may be associated with the waste and heat exchanges 96A, 96B, 100A, 100B.

It should be appreciated that the fluid modules 92A, 92B described above represents only one exemplary embodiment of a device that may be used to move and/or condition the air supplied to the distribution systems 76A, 76B. Any of a variety of differently configured fluid modules may be used to move and/or provide conditioned air. Other examples of fluid modules that may be used are described in U.S. Pat. Nos. 6,223,539, 6,119,463, 5,524,439 or 5,626,021, which are hereby incorporated by reference in their entirety. Another example of such a fluid module is currently sold under the trademark Micro-Thermal Module™ by Amerigon, Inc. In another example, the fluid module may comprise a pump device without a thermoelectric device and/or waste heat exchanger for thermally conditioning the air. In such an embodiment, the pumping device may be used to remove or supply air to the distribution system 76A, 76B. In yet another embodiment, the fluid modules 92A, 92B, may share one or more components (e.g., pumping devices, thermoelectric devices, etc.) with each other and/or with the vehicles general climate control system. In another embodiment, a single fluid module is used to supply air to both distribution systems 76A, 76B.

In operation, fluid in the form of air can be delivered from the fluid modules 92A, 92B, through the conduits 98A, 98B to the corresponding distribution systems 76A, 76B. As described above, the air flows through the passages 82A, 82B, into the openings 84A, 84B and then along the distribution layers 86A, 86B and through the coverings 74. In this manner, conditioned or unconditioned air can be provided to the front surface 48 of the backrest portion 34 and/or the top surface 50 of the seat assembly. As mentioned above, the air supplied to the seat assembly may enhance or supplement the thermal elements 160A, 160B.

In a modified embodiment, air from within the passenger compartment of the automobile can be drawn through the covering 74, into the distribution layers 86A, 86B and through the openings 84A, 84B. The air then can flow through the distribution passages 82A, 82B, into the inlet passages 78A, 78B and then into the conduit 98A, 98B. In this manner, the temperature control system 36 can provide suction so that air near the surface of the seat assembly 30 is removed. As mentioned above, the air removed from the seat assembly 30 may enhance or supplement the thermal elements 160A, 160B.

An exemplary control system 104 for the temperature control system 36 will now be described with continued reference to FIG. 4. As shown, the control system 104 includes a user input device 106 through which the user of the climate control system 36 can provide a control setting or set mode for the climate control system 36. The control setting can comprise a specific temperature setting (e.g., 65 degrees), a more general temperature setting (e.g., "hot" or "cold"), and/or a setting for the pumping device (e.g., "high," "medium," or "low"). Depending upon the desired configuration, the input device 106 may include any of a variety of input devices, such as, for example, dials, buttons, levers, switches, etc. The user input device 106 may also include a user output that provides visual or audio indicia of the control setting (e.g., an LED display).

With continued reference to FIG. 4, the input device 106 is operatively connected to a control module 110. The control module 110 is, in turn, operatively connected to the pumping devices 102A, 102B and the thermoelectric devices 94A, 94B of the fluid modules 92A, 92B for the backrest portion 34 and seat portion 32. The control unit 110 is also operatively connected through control lines (not shown) to the thermal elements 160A, 160B. Temperature sensors 112, 124 are provided to measure the temperature of the fluid conditioned by the thermoelectric devices 94A, 94. The temperature sensors 112, 124 are also operatively connected to the seat control module 110. Temperature sensors (not shown), which are preferably located near or proximate to the thermal elements 160A, 160B may also be operatively connected to the control module 110.

In the illustrated embodiment, the control module 110 is operatively connected to a power source 114 and a ground source 116 and includes an appropriate power control unit to provide sufficient electrical capacity to operate one, a plurality or all of the aforementioned devices (92B, 92B, 112, 124, 160A, 160B). In some embodiments, the seat control module 110 also has a controller that is configured to receive the occupant inputs from the input device 106 and the temperature information from the temperature sensors 112, 124. From this information, the seat control module 110 is configured to adjust the operation of the thermal elements 160A, 160B, the thermoelectric devices 94A, 94B and/or the fluid pumps 102A, 102B according to a predetermined logic designed to ensure occupant comfort and to protect against system damage.

Those of skill in the art will appreciate that the seat control module 110 can comprise a hard-wired feed back control circuit, a dedicated processor or any other control device that can be constructed for performing the steps and functions described herein. In addition, the controller within the control module 110 may be combined or divided into subcomponents as deemed appropriate. For example, it may be advantageous to divide the control module into a first module for conditioning the backrest portion 34 and a second control module for conditioning the seat portion 32. See e.g., co-pending U.S. patent application Ser. No. 10/047,077, filed Jan. 31, 2005, which is hereby incorporated by reference herein. In another embodiment, separate control modules may be provided for the thermal elements 160A, 160B and the fluid modules 92A, 92B. In addition, it should be appreciated that the control system 104 represents only one exemplary arrangement of a system for controlling the operation of the climate control system 36. Those of skill in the art will recognize in light of the disclosure herein various other configurations for the control system 104. In addition, one or more components of the control module 110 may be located in various locations, such as, within one or both of the fluid modules 92A, 92B or in a separate location.

Various components are described as being "operatively connected" to the control unit. It should be appreciated that this is a broad term that includes physical connections (e.g., electrical wires or hard wire circuits) and non-physical connections (e.g., radio or infrared signals). It should also be appreciated that "operatively connected" includes direct connections and indirect connections (e.g., through additional intermediate device(s)).

The control module 110 optionally may also be configured to receive a signal from a vehicle control device 118 that indicates whether the vehicle's ignition has been turned on. In this manner, the seat control module 110 may be configured to allow operation of the system 36 only if the vehicle's engine is running.

In one embodiment, the thermal elements 160A, 160B are activated to heat the surfaces 48, 50 of the backrest portion 34 and seat portion 32. While the thermal elements 160A, 160B are activated, the fluid modules 92A, 92B can provide a fluid flow to the surfaces 48, 50 of the backrest portion 34 and seat portion 32. The fluid may be unconditioned (e.g., not heated) and in such an embodiment the fluid can enhance the thermal elements 160A, 160B by promoting convection of heat from the thermal elements to the surfaces 48, 50 of the backrest portion 34 and seat portion 32. In another embodiment, while the thermoelectric devices 94B, 94B are activated, the fluid modules 92A, 92B provide heated air to the surfaces 48, 50 of the backrest portion 34 and seat portion 32. In this manner, the fluid modules 92A, 92B supplement and enhance the heating effect provided by the thermal elements 160A, 160B. In yet another embodiment, the thermal elements 160A, 160B are used during a first or initial period of time to heat the surfaces 48, 50 of the backrest portion 34 and seat portion 32 largely through conduction. After the first or initial period of time, the fluid modules 92A, 92B can provide conditioned or un-conditioned air to the surfaces 48, 50 of the backrest portion 34 and seat portion 32.

The above described embodiments have several advantages. For example, in particularly cold conditions, it may take a long period of time to heat noticeably the seat assembly using heated air provided by the fluid modules alone. In the above described embodiment, because the thermal elements 160A, 160B are positioned near the surfaces 48, 50 of the backrest portion 34 and seat portion 32, they can provide immediate heat via conduction that can be sensed by the occupant of the seat assembly 30. The air provided through the distribution system 76A, 76B can enhance (e.g., through convection) or supplement (e.g., by providing conditioned air) the heat provided by the thermal elements 160A, 160B.

Accordingly, in one embodiment the control module 110 can be configured to use both the thermal elements 160A, 160B and heated air provided by the fluid modules 92A, 92B during particularly cold conditions (e.g., as determined by an appropriately positioned sensor). In addition to or in an alternative embodiment, the control module 110 can be configured to use both the thermal elements 160A, 160B and heated air provided by the fluid modules 92A, 92B when the user selects an elevated (e.g., high or maximum) setting. In a lower setting (e.g., low and/or medium), only the thermal elements 160A, 160B or the fluid modules 92A, 92B can be used to heat the seat assembly 30.

In addition, some climate control systems are relatively expensive and thus may not be suitable for all applications. In particular, the thermoelectric elements 94A, 94B may be too expensive for some applications. In such applications, the fluid modules 92A, 92B may be formed without the thermoelectric elements 94A, 94B and may be used to simply provide air to and/or remove air from the seat surface through the distribution system 76A, 76B. In this manner, a low cost climate control system is formed. In such a system, the thermal elements 160A, 160B are used to selectively control (e.g., heat) the surfaces of the seat assembly 30. The fluid flow provided by the fluid modules 92A, 92B can used to enhance the transfer of heat to the occupant and/or the thermal elements 160A, 160B can be operated alone. When cooling is desired, the fluid modules 92A, 92B can provide air flow to the seat assembly or withdraw air from the seat surface to provide a cooling effect.

In a modified embodiment, the fluid module 92A, 92B can include a thermoelectric element that is configured to provide only and/or primarily cooled air to the seat surface through the distribution system 76A, 76B. The control module 110 can be configured such that when the user desires cooling, the fluid module 92A, 92B provides cooled air to the seat surface. When the user desires heating, the thermal elements 160A, 160B can be used to heat selectively the surfaces of the seat assembly 30. During heating, the fluid modules 92A, 92B can provide fluid to enhance the transfer of heat to the occupant and/or the thermal elements 160A, 160B can be operated alone. In this embodiment, the control module 110 and fluid modules 92A, 92B can be simplified because the thermoelectric element devices do not have to be configured to provide both cooling and heating functions.

While various embodiments and modes of operation have been described above, it is anticipated that the different portions of the seat assembly 30 (e.g., seat and backrest portions) may be controlled in modified manners and/or controlled to different temperature settings.

Figure 2B:
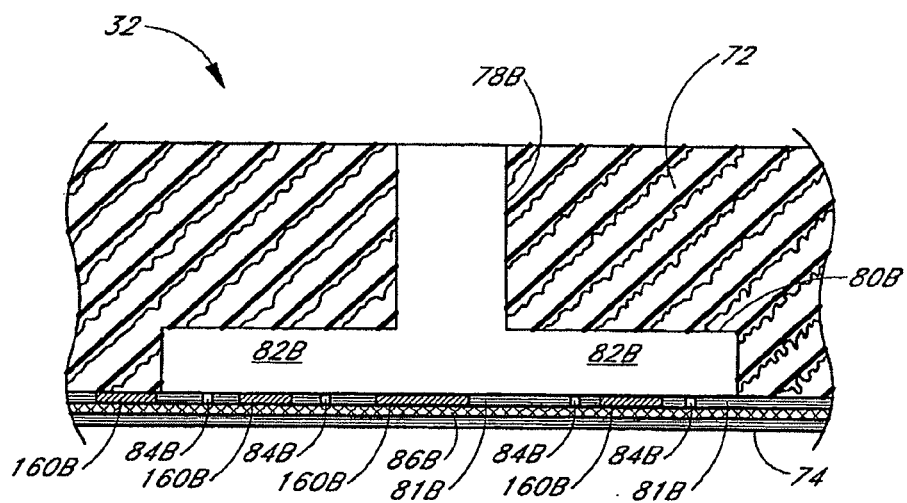
FIG. 2B is a cross-sectional view of the vehicle seat assembly of FIG. 1 taken along line 2B-2B of FIG. 2.
Figure 5A:
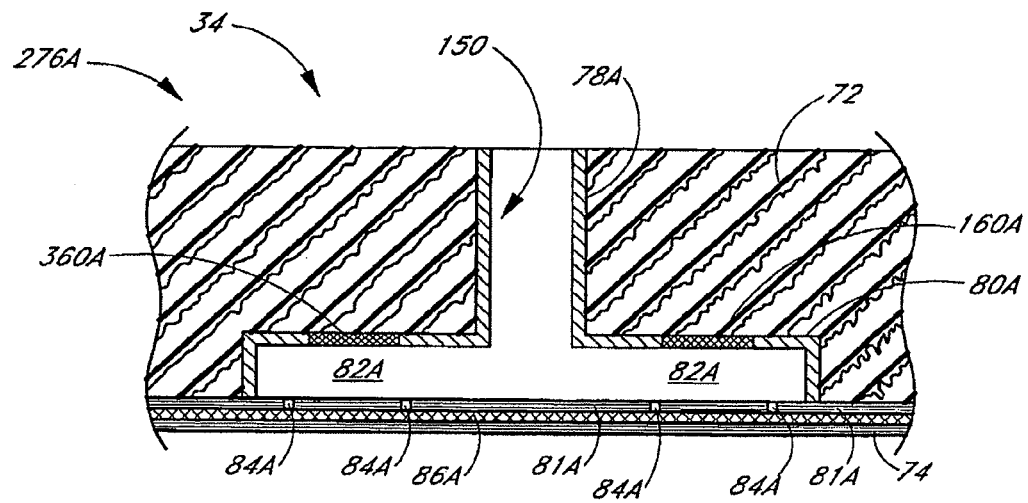
FIG. 5A is a cross-sectional view of a backrest of a modified embodiment of a vehicle seat assembly.
Figure 5B:
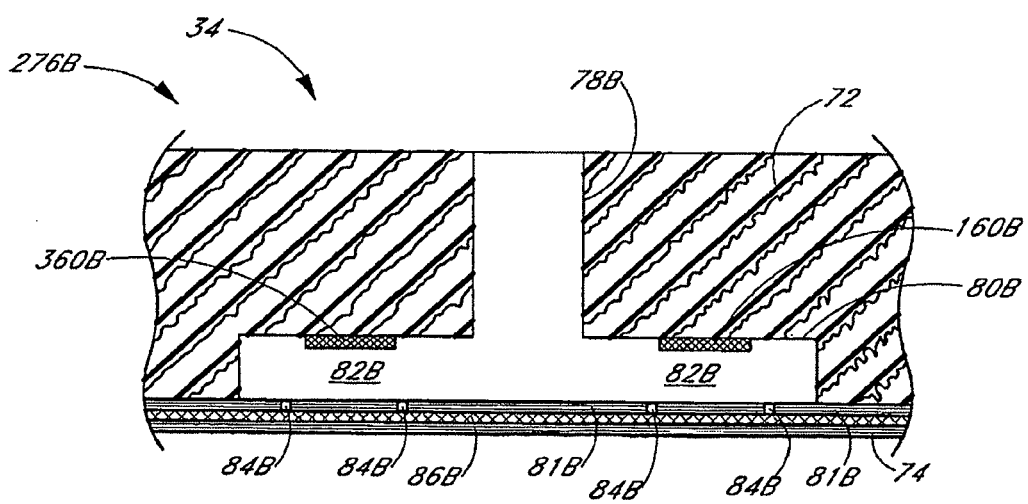
FIG. 5B is a cross-sectional view of a seat of a modified embodiment of a vehicle seat assembly.

FIGS. 5A and 5B illustrate portions of a distribution system 276A, 276A of a modified embodiment of a climate control system. In FIGS. 5A and 5B, like elements to those shown in FIGS. 2A and 2B are designated with the same reference numbers used in FIGS. 2A and 2B. In addition, only certain components of the climate control system will be described in detail below. For those components not described in detail, reference may be made to the detailed description above.

As with the embodiments described above, the climate control system generally comprises thermal elements 360A, 360B, fluid modules (not shown) and the distribution systems 276A, 276B. In this embodiment, the heating elements 360A, 360B are positioned generally within or proximate to the distribution passages 82A, 82B and/or the inlet passages 78A, 78B which are used to transport air through the seat assembly 30. In this manner, the heating elements 360A, 360B may be used to heat the air delivered to the surfaces 48, 50 of the seat assembly 30.

With respect to the illustrated embodiment, the thermal element 160A for the backrest portion 34 may form at least in part a portion of the insert 150, which forms the distribution passage 82A. The air flowing through the distribution passage is heated by the thermal element 360A and then delivered to the occupant through the openings 84A. In a modified embodiment, the thermal element 360A may be positioned along the inner or outer surface of the insert 150.

With respect to FIG. 5B and the seat portion 32, the thermal elements 360B may line and/or form part of the channels 80B in the seat cushion 72. As with the backrest 34, the thermal elements 360B heat the air flowing through the passages 82B. In other embodiments, the thermal elements 360B may be positioned within the cushion 72.

Accordingly, with the thermal elements 360A, 360B generally positioned within the seat cushion 72 between the seat cover 74 and the backside 56 or under side 70 of the seat assembly 30, the thermal elements 360A, 360B can heat the air delivered by the fluid module to the seat assembly 30. It should be appreciated that in a modified embodiment one or more thermal elements (not shown) can be provided near or adjacent the front or top surface of the seat. In such an embodiment, the thermal elements can be provided within the scrim 81A, 81B as described above with reference to FIGS. 2A and 2B.

Figure 6A:
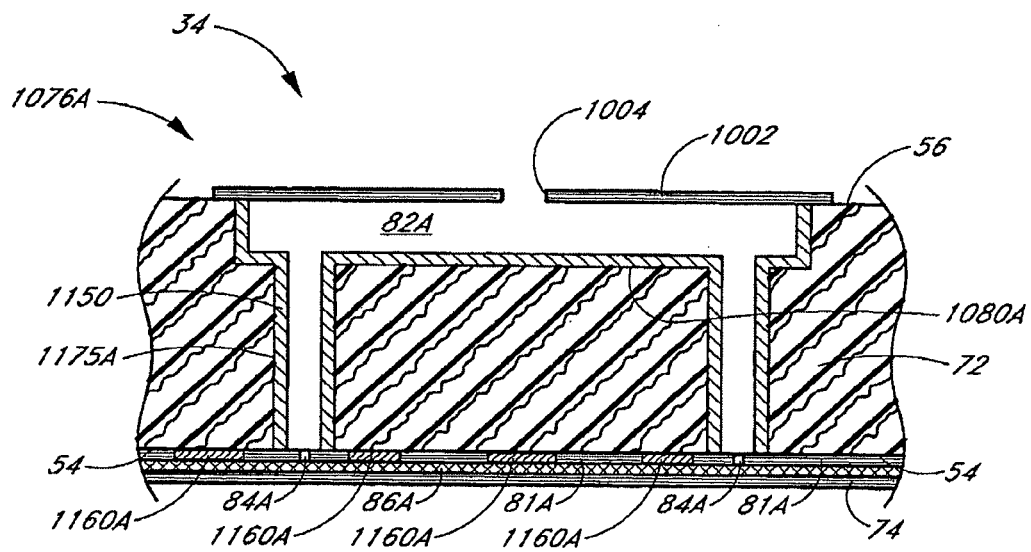
FIG. 6A is a cross-sectional view of a backrest of another modified embodiment of a vehicle seat assembly.
Figure 6B:
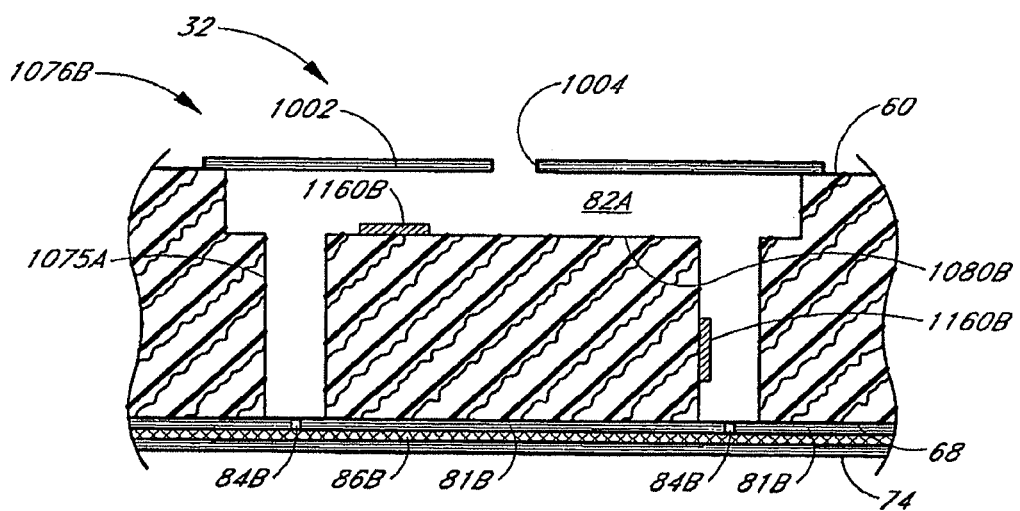
FIG. 6B is a cross-sectional view of a seat of an additional modified embodiment of a vehicle seat assembly.

FIGS. 6A and 6B illustrate portions of a distribution system 1076A, 1076B other modified embodiments of a climate control system. In FIGS. 6A and 6B, like elements to those shown in FIGS. 2A and 2B are designated with the same reference numbers used in FIGS. 2A and 2B. In addition, only certain components of the climate control system will be described in detail below. For those components not described in detail, reference may be made to the detailed description above.

As with the embodiments described above, the climate control system generally comprises thermal elements 1160A, 1160B, fluid modules (not shown) and the distribution systems 1076A, 1076B. With reference to FIG. 6A, in this embodiment, the distribution system 1076A for the backrest portion 34 includes at least one and preferably a plurality of channels 1080A, which are positioned generally on the rear side 56 of the seat cushion 72. At least one and preferably a plurality of through passages 1075A extend from the channels 1080A to the front side 54 of the cushion 72. The passages 1075A are covered by a cover or scrim 81A, distribution layer 86A and covering 74, which can be arranged and/or combined as described above with reference to FIGS. 2A and 2B. In the illustrated embodiment, the thermal elements 1160A are positioned within the scrim 81A near the openings 84A. An insert 1150 as described above may be provided within the channels 1080A and/or the passages 1075A. A rear covering 1002 with an inlet 1004 is provided for defining distribution passages 82A and connecting the distribution passages 82A to a fluid module. In addition, it should be appreciated that in a modified embodiment one or more thermal elements (not shown) can be provided within or near the channels 1080A or passages 1075A as described below with reference to FIG. 6B.

FIG. 6B illustrates the distribution system 1076B for the seat portion 32. As with the backrest portion 34 shown in FIG. 6A, the distribution system 1076B includes a least one and preferably a plurality of channels 1080B, which are positioned generally on the bottom side 60 of the seat cushion 72. At least one and preferably, a plurality of through passages 1075B extend through from the channels 1080B to the top side 54 of the cushion 72. The passages 1075B are covered by a cover or scrim 81B, distribution layer 86B and covering 74, which can be arranged and/or combined as described above with reference to FIGS. 2A and 2B. A bottom covering 1002 with an inlet 1004 is provided for defining distribution passages 82B and connecting the distribution passages 82B to a fluid module.

In this embodiment, the heating elements 1160B are positioned generally within or proximate to the distribution passages 82B as formed by the channels 1080B and/or through passages 1075B, which are used to transport air through the seat assembly 30. In addition, the distribution system 1076B of this embodiment does not include an insert. However, as mentioned above, it should be appreciated that certain components and features of the distribution systems 1076A, 1076B for the seat and cushion portions 32, 34 may be exchanged and/or combined. For example, the seat portion 32 may include an insert and/or the thermal elements can positioned within the scrim. In addition, it should be appreciated that in a modified embodiment one or more thermal elements (not shown) can be provided near or adjacent the top surface of the seat. In such an embodiment, the thermal elements can be provided within the scrim 81B as described above with reference to FIG. 2B.

Figure 7:
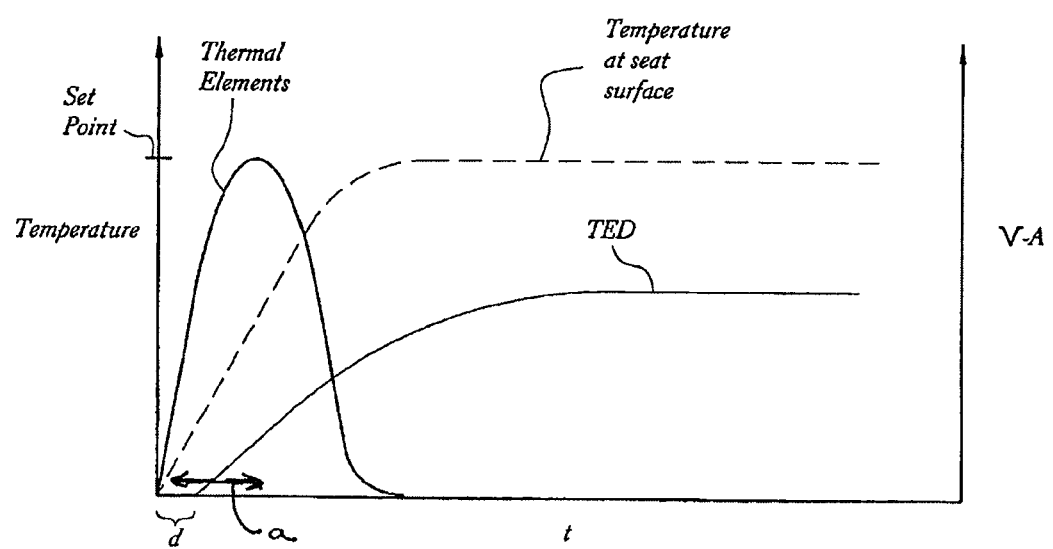
FIG. 7 is a graphical illustration of the power supplied to a heating element and a fluid module of an embodiment of a climate control system.

As mentioned above, in one embodiment, the thermal elements 160A, 160B can be used during a first or initial period of time to heat the surfaces 48, 50 of the backrest portion 34 and seat portion 32 largely through conduction. After the first or initial period of time, the fluid modules 92A, 92B can be used to provide conditioned or un-conditioned air to the surfaces 48, 50 of the backrest portion 34 and seat portion 32. FIG. 7 is a graphical illustration of one embodiment of a control routine, which can be used in such an embodiment.

As shown in FIG. 7, the user can provide the control unit 110 with a set temperature. For example, the user can choose between high, medium and low settings, which each correspond to a set temperature. In another embodiment, the user can select the temperature (e.g., 100 degrees) on a dial or other input device. The controller 110 is configured such that during an initial time period d, power is supplied to the thermal elements 160A, 160B while the fluid modules 92A, 92B remain off. In a modified embodiment, during this initial time period d, unconditioned fluid can be provided to the seat by the fluid transfer device 102A, 102B to enhance the heating by the thermal elements 160A, 160B. After the initial time period d, the controller 110 can activate the thermal electric unit 94A, 94B and the fluid transfer device 102A, 102B (if not already activated). In the illustrated embodiment, there is a transition period in which the power supplied to the fluid modules 92A, 92B is increased and the power supplied to the thermal elements 160A, 160B is decreased. During this period, it can be advantageous to keep the total power supplied to the thermal elements 160A, 160B and the fluid modules 92A, 92B substantially constant. After a certain period of time, the power supplied to the thermal elements 160A, 160B is terminated while the fluid modules 92A, 92B are used to heat the seat assembly 30.

As shown by the arrow a in FIG. 7, the controller 110 can be configured to start the climate control system 36 when the thermal elements 160A, 160B are activated or after an initial time period d. In one embodiment, the time period d is greater than 60 seconds and, in another embodiment, the time period d is greater than 120 seconds. In certain embodiments, the fluid modules 92A, 92B are activated after the thermal elements 160A, 160B are turned off. In other embodiments, the fluid modules 92A, 92B are activated while the thermal elements 160A, 160B are still being supplied power (e.g. as illustrated in FIG. 7).

As mentioned above, because the thermal elements 160A, 160B are positioned near the surfaces 48, 50 of the backrest portion 34 and seat portion 32; they can provide immediate heat via conduction that can be sensed by the occupant of the seat assembly 30. This can be particularly advantageous in cold conditions where it may take a long period of time to heat noticeably the seat assembly using heated air provided by the fluid modules alone. After a period of time the fluid modules 92A, 92B provide a sufficient amount of heated air to the user that the power supplied to the thermal elements 160A, 160B can be turned off or significantly reduced. The transition from using the thermal elements 160A, 160B to using the fluid modules 92A, 92B to provide heating is preferably configured such that the user does not notice the transition.

To assist in the description of the disclosed embodiments, words such as upward, upper, downward, lower, vertical, horizontal, upstream, and downstream have been used above to describe the accompanying figures. It will be appreciated, however, that the illustrated embodiments can be located and oriented in a variety of desired positions.

In the above description, various components are described as being associated with the "back" or "seat" cushion. In modified embodiments, it should be appreciated that the subcomponents of the back and seat cushions may be reversed and/or made to the same. In still other embodiments, the various components of the illustrated embodiments may be combined and/or may be applied to different zones of a seat, such as, for example, a top and bottom portion of a backrest portion. In other embodiments, the features of the back and seat cushions may be applied to different zones of an occupant area that are to be thermally conditioned, such as, for example, back and rear seat assemblies or left and right seat assemblies.

Although the foregoing description of the preferred embodiments has shown, described, and pointed out certain novel features, it will be understood that various omissions, substitutions, and changes in the form of the detail of the apparatus as illustrated, as well as the uses thereof, may be made by those skilled in the art without departing from the spirit of this disclosure. Consequently, the scope of the present invention should not be limited by the foregoing discussion, which is intended to illustrate rather than limit the scope of the invention.

What is claimed is:

1. A method for thermally conditioning a seat assembly, the method comprising:
   providing a seat cushion defining a support surface, and a seat covering that covers the support surface of the seat cushion;
   wherein the seat assembly comprises at least one resistive heating element positioned within the seat assembly beneath the seat covering, said at least one resistive heating element configured to conductively heat a space adjacent the seat assembly;
   wherein the seat assembly comprises at least one fluid module positioned generally away from the seat covering, said at least one fluid module configured to convectively heat a space adjacent the seat assembly, wherein said at least one fluid module comprises a blower and a thermoelectric device;
   receiving instructions from an occupant regarding a desired operational setting for the seat assembly;
   sensing a temperature associated with an actual thermal condition at or near the space adjacent the seat assembly using at least one temperature sensor;
   providing information regarding the desired operational setting and temperature to a control module, said control module being configured to operate the at least one heating element and the at least one fluid module;
   wherein the control module is adapted to selectively regulate the at least one heating element and the at least one fluid module to thermally condition the space adjacent the seat assembly according to a target control scheme;
   activating or deactivating at least one of the at least one heating element, the blower and the thermoelectric device based on the target control scheme;
   during a first conditioning mode, activating the at least one heating element to conductively heat the space adjacent the seat assembly;
   during a second conditioning mode, activating at least one of the blower and the thermoelectric device to convectively heat the space adjacent the seat assembly; and
   after a period of time, deactivating the at least one heating element;
   wherein the first conditioning mode generally precedes or is used concurrently with the second conditioning mode;
   wherein a target desired temperature at the space adjacent the seat assembly is attained more quickly by activating the at least one heating element than by only directing heated air from the at least one fluid module; and
   wherein, when both the at least one heating element and the and the at least one fluid module are activated, deactivating the at least one heating element helps reduce total power consumption of the seat assembly while maintaining a desired level of comfort for the occupant.

2. A method as in claim 1, wherein the at least one heating element comprises a resistive heater.

3. A method as in claim 1, further comprising generating heat within a space generally beneath the seat covering of the seat assembly.

4. A method as in claim 1, further comprising generating heat within a space generally beneath the seat covering of the seat assembly and generally above the seat cushion of the seat assembly.

5. A method as in claim 1, wherein the step of activating the at least one fluid module begins at least 60 seconds after the at least one heating element has been activated.

6. A method as in claim 1, wherein the step of activating the at least one fluid module begins at least 120 seconds after the at least one heating element has been activated.

7. A method as in claim 1, wherein the step of activating the at least one fluid module begins after the at least one heating element has been deactivated.

8. A method as in claim 1, wherein the steps of activating the at least one heating element and activating the at least one fluid module occur substantially simultaneously.

9. A method as in claim 1, wherein the at least one heating element and the at least one fluid module are both activated during a period of time, wherein during said period of time the total current supplied to a climate control system of the seat assembly remains substantially constant or is reduced over time.

10. A method for selectively heating a space adjacent a seat assembly, said seat assembly including (i) a seat cushion that defines a support surface, and (ii) a seat covering that covers the support surface of the seat cushion, the method comprising:
   receiving instructions from an occupant regarding a desired operational setting for the seat assembly;
   sensing a temperature associated with a level of actual thermal conditioning occurring at the seat assembly using at least one temperature sensor;
   providing the desired operational setting and a sensed temperature to a control module;
   wherein the control module is adapted to selectively regulate a heating element and a fluid module to thermally condition a space adjacent the seat assembly according to a control scheme, said fluid module comprising a fluid transfer device and a thermoelectric device;
   wherein said control scheme comprises a first thermal conditioning mode and at least a second thermal conditioning mode;

during the first thermal conditioning mode, activating the heating element to conductively heat a space adjacent the seat assembly; and during the second thermal conditioning mode, transferring air using the fluid module to a space adjacent the seat assembly through a distribution system of the seat cushion to selectively heat the space adjacent the seat assembly; and wherein the first thermal conditioning mode and the second thermal conditioning mode are configured to overlap for at least a portion of time so that the heating element and the fluid module are operated concurrently to provide an enhanced heating effect to a seated occupant.

11. The method of claim 10, wherein the desired operational setting for the seat assembly comprises a general temperature setting.

12. The method of claim 10, wherein the desired operational setting for the seat assembly comprises a specific temperature or temperature range.

13. The method of claim 10, wherein the seat assembly comprises a seat back portion and a seat bottom portion, wherein the desired operational setting for the seat back portion is different that the desired operational setting for the seat bottom portion.

14. The method of claim 10, wherein the heating element comprises a resistive heater.

15. The method of claim 10, wherein the second thermal conditioning mode begins at least 60 seconds after an initiation of the first thermal conditioning mode.

16. The method of claim 10, wherein the second thermal conditioning mode begins at least 120 seconds after an initiation of the first thermal conditioning mode.

17. The method of claim 10, wherein the second thermal conditioning mode begins generally simultaneously with the first thermal conditioning mode.

* * * * *